Patented Sept. 11, 1934

1,973,493

UNITED STATES PATENT OFFICE 1,973,493

PROCESS FOR MANUFACTURING PLASTIC COMPOSITIONS

Carl J. Malm and Charles R. Fordyce, Rochester, N. Y., assignors to Eastman Kodak Company, Rochester, N. Y., a corporation of New York No Drawing. Application February 18, 1932, Serial No. 593,869

6 Claims. (Cl. 18—57)

The present invention relates to the production of a resinlike material from cellulose esters containing an unsaturated acyl radical, by treating them with ultra-violet light or heat and the products obtained thereby.

It has been known that acrylic acid esters prepared from glycerol, lactic acid etc. when exposed to sunlight or ultra-violet light polymerize to varnish-like elastic masses. It has also been known for many years that vinyl compounds such as vinyl acetate, vinyl butyrate or vinyl chloride may be polymerized by exposure to ultra-violet light or heat to form resinous plastic materials. However up to the present time it has never been proposed, to our knowledge, to treat cellulose esters, containing unsaturated groups, with ultra-violet light to form a plastic material resistant to all the organic solvents ordinarily employed to dissolve cellulose esters.

We have found that the esters of cellulose, containing unsaturated acyl groups, may be converted, by the application of ultra-violet light or heat, into tough, transparent products, similar in nature to the resinous products produced by treating vinyl compounds with ultra violet light. It is our theory that these cellulose esters, containing unsaturated acyl groups, which are treated by our process, are polymerized by the ultra-violet light or heat applied forming the products with which this application is concerned. Although it is to be understood that we are not to be limited by our theory as to what actually takes place in the present process the phenomena in our invention is apparently similar to that which occurs in the preparation of resinous bodies from compounds containing unsaturated valence bonds, by means of polymerization and the process of our invention hereinafter will be referred to as polymerization and the products of our invention will be referred to as polymerized esters of cellulose in keeping with the terminology customarily employed in reference to the phenomena which appears to be similar to that of the present invention.

We have found that the polymerized cellulose esters produced according to our invention are products resistant to all the common organic solvents, tough, transparent and impermeable to moisture. Because of these characteristics these polymerized cellulose esters find many uses for which the ordinary cellulose esters, which are not resistant to solvents and impermeable to moisture, are unsuitable.

Our invention contemplates the use of either the simple or the mixed esters of cellulose which contain unsaturated acyl groups. Some typical esters of cellulose which may be polymerized according to our invention are: cellulose crotonate, cellulose stearate-crotonate, cellulose cinnamate, cellulose acetate-crotonate, cellulose tiglate, cellulose oleate, cellulose laurate-cinnamate. This list of esters illustrates some of the unsaturated acyl groups which when attached to cellulose form esters which may be subjected to a polymerization treatment.

One of the unique features of our invention is the formation of the product desired, such as a sheet or skin of the cellulose ester, and its subsequent conversion into a polymerized cellulose ester by ultra-violet light or heat while in that form. It has heretofore been known to subject cellulose esters to a hydrolyzing agent when in filament form to convert the exterior surface thereof but no treatment of cellulose esters in the form of finished products has been known previously to convert chemically the entire ester. From the above it may be seen that our polymerized esters can be employed to prepare commercial products in which the ordinary colloidized esters of cellulose such as cellulose acetate have previously been employed.

The following examples illustrate the application of our invention to certain specific embodiments thereof:

Example I

A 4:1 solution of cellulose tricrotonate in acetone was coated out in the form of a sheet or skin. This colloidized cellulose tricrotonate sheet was subjected to the action of ultra-violet light (such as direct sunlight or the rays of a mercury vapor lamp) for 5 hours. The resulting skin was found to be entirely insoluble in pyridine, chloroform, tetrachlorethane, acetone, carbon tetrachlorid, ethylene chloride etc.

Example II

A cellulose stearate-crotonate containing 5 stearyl and 7 crotonyl radicals for every 24 carbon atoms in the cellulose was dissolved in toluene and a skin was coated from this solution. The skin was exposed to ultra-violet light for about 5 hours and the product formed thereby was found to be insoluble in all the common organic solvents. This skin was also found to be very flexible even though no plasticizer was incorporated therein.

We have also found that treatment of the polymerizable esters of cellulose with heat for a time gives products having the same characteristics as those formed by the treatment with ultra violet light. If a skin coated from a solution of cellulose crotonate is subjected to 100° C. for about 24 hours a sheet will be formed which is resistant to the action of all the commonly used organic solvents. As yet we have not found any organic solvent for the polymerized cellulose esters produced according to our invention.

The polymerized cellulose esters which may be produced according to our invention have the characteristic of being impermeable and resistant to moisture which is an unusual property of cellulosic materials. We have found that when a skin or sheet of a cellulose ester containing an unsaturated acyl group is exposed to ultra violet light according to our invention the moisture impermeability of the sheet is increased 3 or 4 times that which it possessed originally. Due to this property of moisture resistance or impermeability, a thin sheet (.001–.005 m. m.) composed of a polymerized cellulose ester is eminently suited for the wrapping of food products, cigarettes or any material the moisture content of which it is desirable to maintain unaltered.

The use of sheeting of regenerated cellulose as a wrapping material is common at the present time, however this regenerated cellulose sheeting has a low impermeability to moisture so that it will not retain materials which may be wrapped in it, in as fresh a condition as would be the case when a moistureproof wrapping material is used. However, a sheet of regenerated cellulose having a thin layer of a polymerized cellulose ester, produced according to our invention, on one or both sides is a wrapping material of high impermeability to moisture which will keep easily drying materials which are wrapped therein in a fresh condition for long periods of time. This moistureproof layer may be applied merely by spreading a layer of a cellulose ester containing an unsaturated acyl group, upon the regenerated cellulose sheet, in any well-known manner such as from its solution in a volatile solvent and subsequently treating the layer with ultra-violet light or heat.

Sheets of cellulose derivatives such as cellulose nitrate, cellulose acetate, cellulose acetatepropionate, and cellulose ethers may also be moistureproofed if desired, by applying thereon a thin layer on one or both sides in the same manner as described with reference to the moisture-proofing of regenerated cellulose or in any manner which is apparent to the individual operator.

The sheeting from our polymerized esters is eminently suited for use in cases in which swelling by moisture of the sheet is undesirable. For example in the construction of shoes sheets of polymerized cellulose ester are suitable for the making of box toes and insertion at any point in the shoe which might admit the seepage of moisture into its interior. This polymerized ester sheeting which is inert to the action of solvents, moisture etc. may be employed as one or several of the intermediate layers in the making of laminated glass. The sheet will remain unaffected by an influence such as moisture which may find entrance between its laminations and which in some types of ordinary laminated glass causes swelling and opaqueness in the cellulose ester sheet. Our polymerized cellulose esters may also be employed to seal the edges of laminated glass sheets to prevent the entrance or exit of moisture and the exit of the residual solvent and plasticizer which may be present in the interior laminations of the glass.

If desired, products of any form may be composed of our polymerized ethers by first forming the product from a cellulose ester containing an unsaturated acyl group and then subjecting to heat or ultra-violet light. Also cloth or fabrics may be impregnated with a solution of a cellulose ester having an unsaturated group, the solvent may be driven off and the ester may be polymerized by our process. Filaments or threads containing these unsaturated acyl cellulose esters may also be made impermeable and resistant to the action of liquids or dyes by the process of our invention. Such threads give promise of being particularly useful for electrical insulation purposes as they do not allow of moisture penetration and also have a satisfactory resistance to the passage of electrical current.

Various materials such as dyes or pigments, plasticizers, resins, cellulose esters having saturated acyl groups etc. which are compatible with the carrying out of our invention may be incorporated with the cellulose unsaturated acylates previous to their polymerization if desired. For example, if desired, products may be formed of a mixture of cellulose stearate and cellulose crotonate and the product may then be submitted to polymerization. The cellulose stearate will act as a plasticizer in the product formed.

The process which we have invented also gives promise of being of interest in the photographic industry. As ultra-violet light will render cellulose esters containing unsaturated acyl groups insoluble in organic solvents, this fact makes possible the recording of images by exposing the sheet to ultra-violet light over a portion of the sheet, the remainder being blocked out by an opaque design or negative and the exposed sheet then being dyed by a solvent which affects the unexposed portion but not the exposed portions such for instance as is done in photoengraving.

Various other ramifications of our process of making polymerized cellulose esters and of the uses therefor will be apparent to those skilled in the art and come within the scope of our invention.

What we claim as our invention is:

1. A method of preparing a solvent-resistant sheet which comprises forming a sheet containing an ester of cellulose having an unsaturated acyl group and then treating the skin with a polymerizing agent selected from the group consisting of intense ultra-violet light for approximately five hours or more and heat of approximately 100° C. for at least about 24 hours.

2. A method of preparing a solvent-resistant sheet which comprises forming a sheet containing an ester of cellulose having an unsaturated acyl group and then treating the skin with intense ultra-violet light for approximately five hours to polymerize the same.

3. A method of preparing a solvent-resistant sheet which comprises forming a sheet containing an ester of cellulose having an unsaturated acyl group and then treating the skin with heat of approximately 100° C. for about 24 hours or more to polymerize the same.

4. A method of preparing a solvent-resistant sheet which comprises forming a sheet containing an ester of cellulose having a crotonyl group and then treating the skin with a polymerizing agent selected from the group consisting of intense ultra-violet light for approximately five hours or more and heat of approximately 100° C. for at least about 24 hours.

5. A method of preparing a solvent resistant sheet which comprises forming a sheet containing an ester of cellulose having a crotonyl group and then treating the skin with intense ultraviolet light for approximately five hours to polymerize the same.

6. A method of preparing a solvent-resistant sheet which comprises forming a sheet containing an ester of cellulose having a crotonyl group and then treating the skin with heat of approximately 100° C. for about 24 hours or more.

CARL J. MALM.
CHARLES R. FORDYCE.